United States Patent [19]

Spash

[11] Patent Number: 4,630,158
[45] Date of Patent: Dec. 16, 1986

[54] VERTICALLY LOADING HEAD MODULE FOR MAGNETIC DISK DRIVE

[75] Inventor: John L. Spash, Harvard, Mass.

[73] Assignee: Digital Equipment Corporation, Maynard, Mass.

[21] Appl. No.: 483,340

[22] Filed: Apr. 8, 1983

[51] Int. Cl.$^4$ .......................... G11B 5/60; G11B 21/20
[52] U.S. Cl. ..................................... 360/103; 360/105
[58] Field of Search ........................ 360/103, 104–107, 360/109, 75

[56] References Cited

U.S. PATENT DOCUMENTS

| | | | |
|---|---|---|---|
| 3,634,837 | 1/1972 | Ridgway et al. | 360/103 |
| 3,896,495 | 7/1975 | Beecroft | 360/103 |
| 4,058,843 | 11/1977 | Gyi | 360/103 |
| 4,209,813 | 6/1980 | Bryer | 360/99 |
| 4,280,156 | 7/1981 | Villette | 360/105 |
| 4,291,350 | 9/1981 | King | 360/104 |
| 4,306,258 | 12/1981 | Higashiyama et al. | 360/105 |
| 4,327,388 | 4/1982 | Wanek | 360/104 |
| 4,449,155 | 5/1984 | Meier et al. | 360/104 |

Primary Examiner—John H. Wolff
Assistant Examiner—David J. Severin
Attorney, Agent, or Firm—Cesari and McKenna

[57] ABSTRACT

A transducer module for a disk drive having a magnetic read/write head supported by a slider which is maintained at a predetermined distance from a rotating disk by an air bearing. The slider is secured to a flexible gimbal within a protective housing. A second flexible gimbal is also secured to the inside of the protective housing and is preloaded to bias the head toward the rotating disk through a pivot, enabling the slider to position itself properly in response to the air flow at the surface of the disk. Means are also provided for retracting the head through a second pivot. With such an arrangement the housing protects the head mechanisms and, when mounted on an actuator arm, allows extension and retractions of the head along an axis perpendicular to the disk surface.

16 Claims, 9 Drawing Figures (sheet 1 of 2)

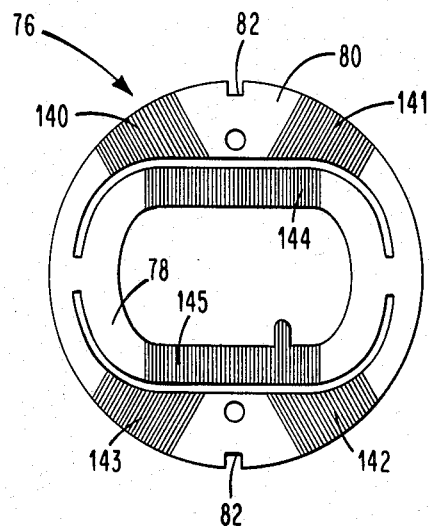
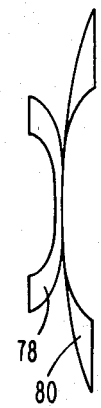
Fig. 3A.
Fig. 3B.
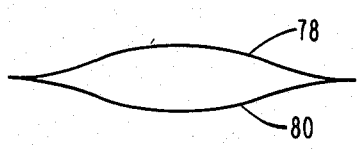
Fig. 3C.
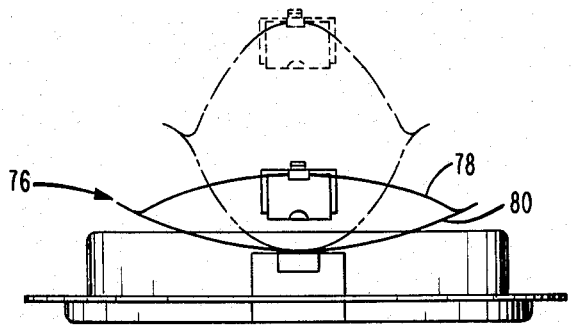
Fig. 3D.

VERTICALLY LOADING HEAD MODULE FOR MAGNETIC DISK DRIVE

BACKGROUND OF THE INVENTION

This invention relates to a transducer assembly for a magnetic recording system such as a disk drive. More particularly the invention relates to an assembly where the transducer is dynamically loaded onto a rotating disk.

In digital systems, such as in a data processing apparatus, disk drives are used as the means for storing large amounts of data that can be quickly read into or written from a computer's main memory. In a disk drive, a disk, having a magnetic coating on its surfaces, is rotated on a spindle at a predetermined speed. An electromagnetic transducer, also called head, is positioned in close proximity to one of the disk surfaces at a predetermined distance from the spindle to either read data (i.e., playback) or write data (i.e., record) along the circular track defined on the disk surface by the rotary motion of the disk with respect to the transducer. By controlling the position of the transducer, a plurality of concentric tracks on the disck surface are defined.

The head is mounted on an aerodynamic member, usually called slider, which is designed to ride over the air flow created by the rotating disk in order to maintain the head at a predetermined distance from the disk surface. To increase the storage density of the disk smaller head/slider assemblies have been used in order to increase the flux density and reduce the area required to store one bit of information.

The slider is mounted on an actuator arm which in turn is mounted on an actuator motor. The actuator motor moves the arm to successively position the head at predetermined locations (i.e., tracks). Both linear and rotary actuator motor/arm assemblies have been used. In a linear assembly, the actuator arm, and therefore the head, is moved linearly along a radius of the rotating disk, while in a rotary assembly, the actuator arm rotates along an axis parallel to the disk spindle at a point close to the outside rim of the disk. In either case, the slider is suspended from the actuator arm, in order to allow the slider to assume the correct attitude over the air bearing, and the suspension support/slider assembly is cantilevered from the more rigid actuator arm. The motion of the slider can be resolved along three mutually orthogonal axes called the pitch, roll and yaw axes. The pitch axis is defined as the transverse axis of the slider, the roll axis is defined as the longitudinal axis of the slider and the yaw axis is normally defined as the vertical axis, assuming that the slider is placed on an horizontal plane, and is mutually orthogonal with the pitch and roll axes. To allow the slider to move freely over the disk surface the cantilevered suspension must provide a low spring rate along the yaw axis. To this end, an elongated cantilevered leaf spring is used. The geometry of the cantilevered spring, however, provides low stiffness not only along the yaw axis of the slider, but also in a direction transverse to the spring's longitudinal axis. This lack of lateral rigidity results in a low frequency resonance characteristic for the cantilevered suspension. This means that, in response to lateral forces exerted on the suspension, the suspension vibrates about its nominal position and consequently interferes with the proper positioning of the head at the selected track. This lack of lateral rigidity might be tolerated in applications using a linear actuator arm since the nominally linear motion along the longitudinal axis the cantilevered suspension spring minimizes the development of lateral forces. However in applications requiring a rotary actuator arm, the combination of arcuate motion and centrifugal force unavoidably generates lateral forces on the cantilevered spring. These lateral forces push the head off its nominal position and interfere with its proper operation. The weight of the suspension assembly, i.e. the suspended mass, further adds to the resonance problem, as well as to the torque requirements of a rotary actuator motor.

SUMMARY OF THE INVENTION

The present invention provides for a light, compact and rigid electromagnetic transducer module adapted to be attached to an actuator arm used in positioning the transducer at the selected location on a disk surface. In the preferred embodiment, the use of gimbals for suspending and preloading a transducer slider result in an assembly having a high lateral stiffness and a low spring rate with respect to movement generally along an axis perpendicular to the disk surface.

This invention also provides for a transducer module housing containing means for suspending a transducer slider from the housing, means for preloading the slider to extend it toward the disk surface and means for unloading the slider to retract it from the disk surface. The means for unloading the slider cooperate with a spring loaded member positioned on the arm to selectively retract the slider. The arrangement of suspending, preloading, and unloading means produces the extension and retraction of the slider along an axis perpendicular to the disk surface to provide an accurate and predictable attitude of the slider to the air bearing. The housing contains and protects the transducer mechanisms. The housing can be rotated on the arm to accurately set the transducer's yaw angle, defined as the relative angular position of the transducer along its yaw axis.

This invention further provides for a slider carrying an electromagnetic transducer and having an aerodynamic surface adapted to float over a rotating disk, a rigid supporting arm for positioning the slider over a selected portion on the disk, and means for elastically attaching the slider to the supporting arm. The attaching means comprise means for applying a predetermined loading force to the slider along an axis perpendicular to the surface of the disk, to allow the slider to freely ride on the air bearing, and means for selectively applying an unload force along this axis to overcome the loading force and remove the slider from a region immediately adjacent the surface of the disk.

BRIEF DESCRIPTION OF THE DRAWINGS

A better understanding of the features of the present invention may be obtained from the accompanying description used in conjunction with the drawings in which:

FIGS. 3A–D show the forming operation for preloading the load diaphragm.

DETAILED DESCRIPTION OF THE PREFERRED EMBODIMENT

Figure 1:
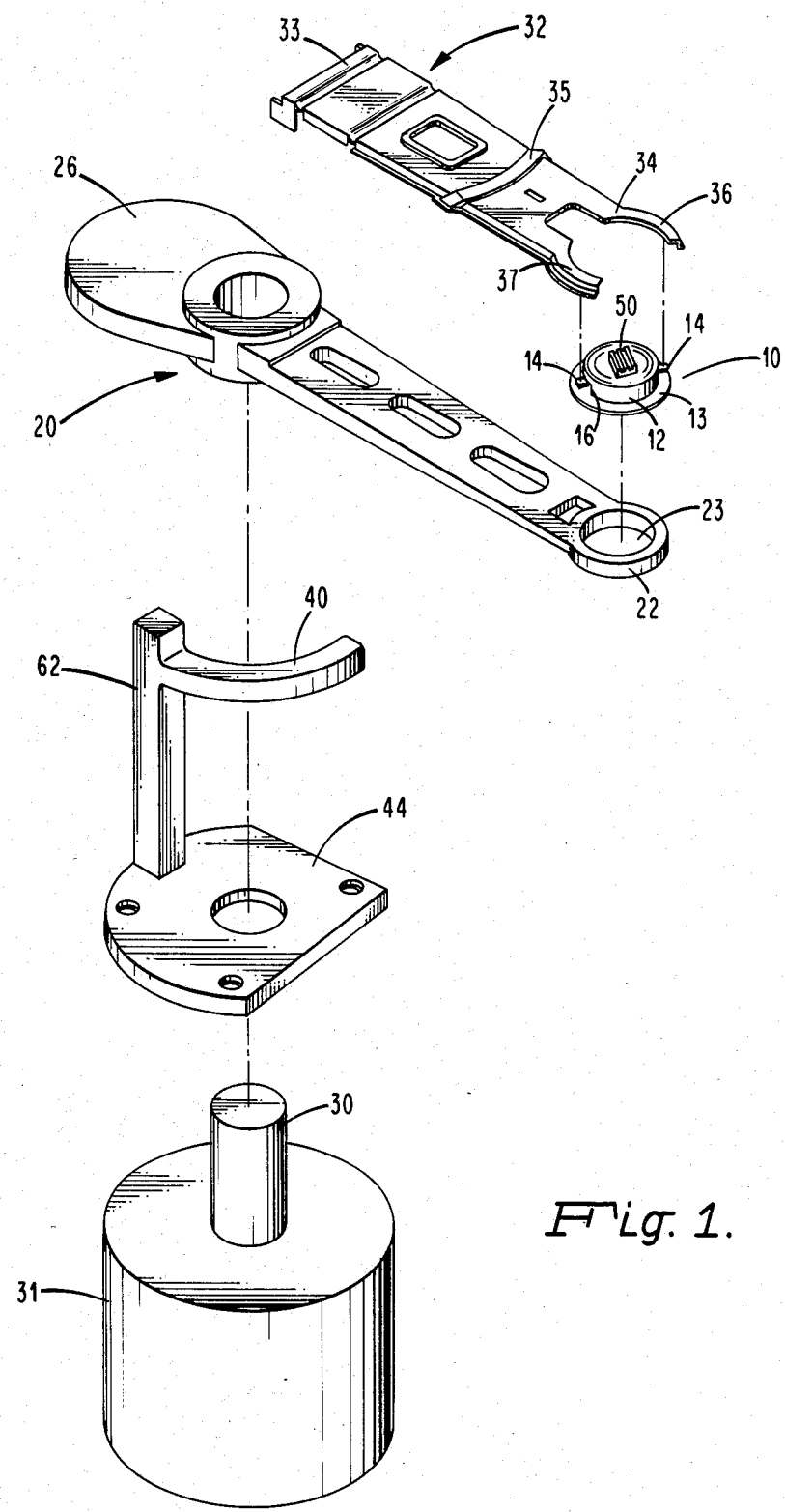
FIG. 1 is an exploded view showing a rotary actuator arm, mounted on a rotary actuator motor, supporting the housing holding the transducer assembly of the present invention.

Referring now to FIG. 1, there is shown the dynamically loadable transducer module 10 of the present invention. For simplicity, only housing 12, read/write head 50 and a portion of the unload beam are shown. The details of transducer module 10 will be described more fully hereinbelow, suffice it to say for now that the read/write head 50 and its suspension assembly are contained within housing 12, and that the head is loaded and unloaded onto a surface of a rotating disk, not shown, by the relative movement of an unload beam up and down the two slots 16 cut on opposite sides of housing 12. Housing 12 is provided with a lip 13 which is welded, or otherwise fastened, to end portion 22 of arm 20. Housing 12, and therefore head 50, is shown facing upwardly, but it should be understood that housing 12 may face any prescribed direction. Arm 20 is coupled to shaft 30 of rotary actuator motor 31 and has an opposite counterweight end 26 extending past the shaft to balance the weight of the arm. Arm 20 has a first portion, starting at the shaft, of uniform predetermined thickness and a second portion of tapering thickness connecting to end portion 22 of uniform thickness. The plane of the surface of end portion 22 to which housing 12 is welded is below the plane of the corresponding surface of the first portion of arm 20.

Leaf spring 32 is provided with a base end 33 and a forked end 34. Base end 33 is attached to the first portion of arm 20 and, due to the tapered thickness of the second portion of arm 20, leaf spring 32 is effectively cantilevered from the attachment region. The forked end 34 has an inner semi-circular edge which clears a corresponding semi-circular side of housing 12. Each of the two ends 14 of the unload beam protruding from housing 12 is welded, or otherwise fastened, to the forked end 34. Leaf spring leaf 32 has a raised portion located midway the two ends for forming a ramp 34. Cam 40 is supported on foot 62 by support plate 44 which is mounted on the casing of actuator motor 31. Cam 40 is used during the unload operation, when the actuator arm 20 is rotated by motor 31 until the lower surface of cam 40 contacts the ramp 35. Continued rotation of arm 20 causes the leaf spring 32 to be pushed in towards the tapered surface of arm 20 and so pivot at the base end 33, which depresses the unload beam. This, as will be explained in more detailed hereinbelow, has the effect of pulling the read/write head 50 away from the disk in a direction perperpendicular to the disk surface. During the load operation the opposite steps take place, thus the read/write head 50 is free to be pushed back toward the disk surface by the assembly within the housing 12.

Figure 2:
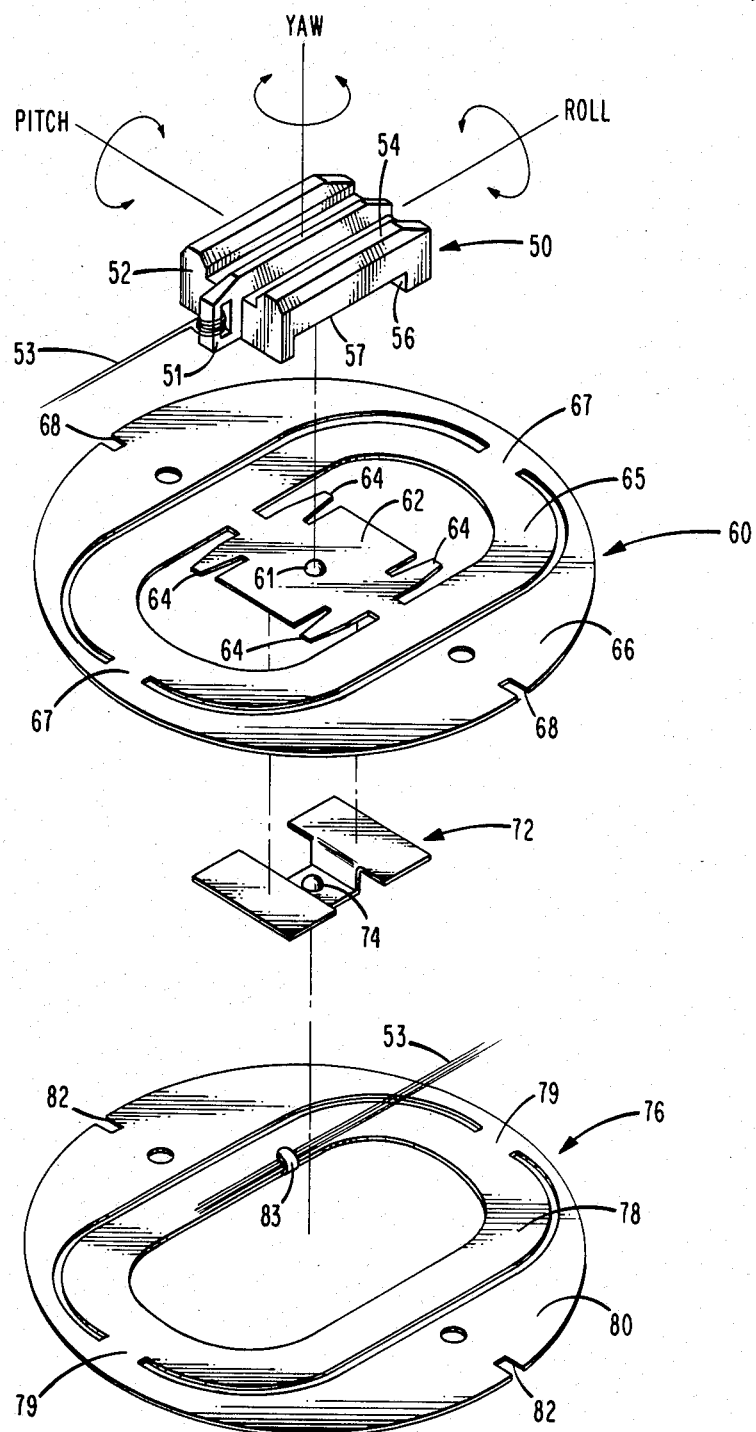
FIG. 2 is an exploded view of the transducer module.
Figure 2:
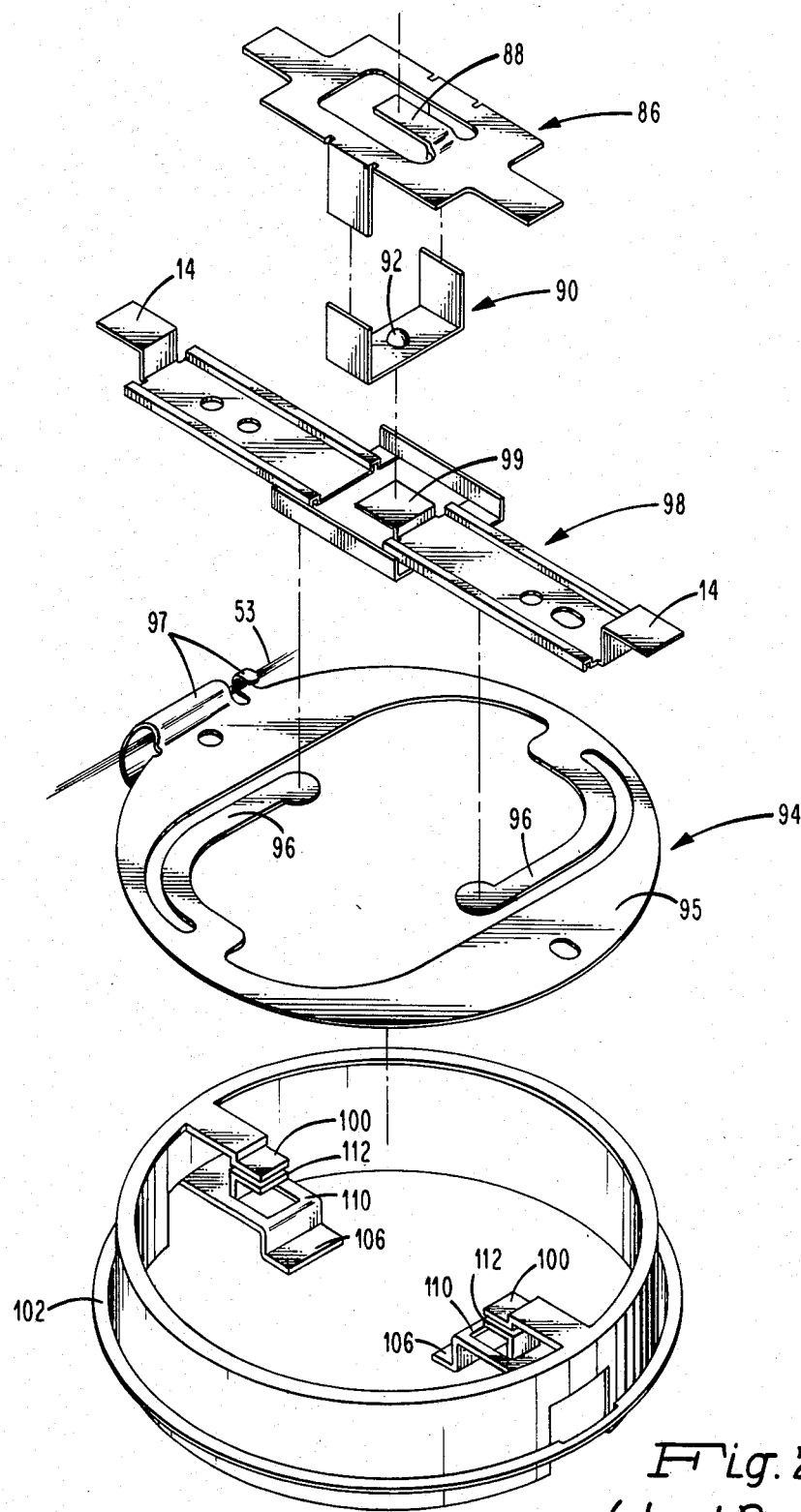
Figure 5:
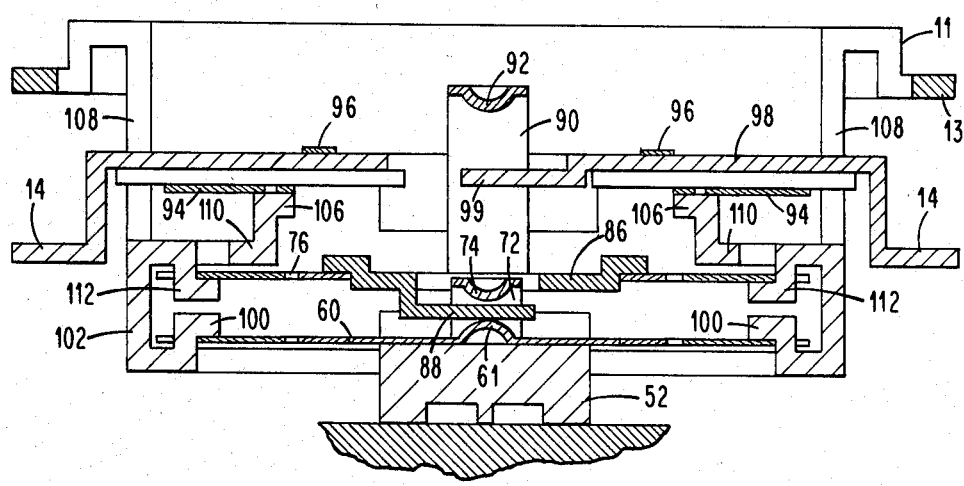

Referring now to FIGS. 2 and 5 there is shown in greater detail the components of transducer module 10. Read/write head 50 comprises magnetic cores 51 and wires 53 forming coils around the cores. Slider 52 has a compound surface 54 which is adapted to respond to the flow of air between the transducer and the moving disk surface to properly position itself and the read/write head 50 over the disk, i.e. to float over the disk surface on an air bearing. Slider 52 is attached to a suspension diaphragm 60. Slider 52 has a rectangular cut out portion 56 which mates with bridge 62 of suspension diaphram 60. The horizontal surface 57 of cutout 56 mates with bridge 62. The shape of bridge 62 and particularly prongs 64 enable bridge 62 to frictionally engage the vertical sides of cutout 56 and help to retain slider 52 on bridge 62, in addition to an epoxy agent present between the horizontal surface 57 of cutout 56 and bridge 62.

Suspension diaphragm 60 has inner and outer frames, 65 and 66 respectively, connected at two diametrically opposed places by bridges 67. The outer frame 66 is attached in two places in the region of cutouts 68 to attachement tabs 100 of housing 12 by any convenient means such as welding. Cutouts 68 mate with a complementary portion of the tabs 100 and thus serve as alignment guides. Suspension diaphragm 60 thus forms a gimbal and with this arrangement slider 52 is free to rotate about the pivot formed by dimple 61.

Attached to the opposite side of the central region of suspension diaphragm bridge 62 is a suspension pickup 72 having a dimple 74, facing toward bridge 62, on its horizontal spanning member. The function of suspension pick-up 72 will be described in more detail below. Suffice it to say here that it is used in the unloading of head 50.

Load diaphragm 76 is similar to suspension diaphragm 60, except for the lack of a central bridge. It has an inner and outer frame, 78 and 80 respectively, connected by bridges 79, and two cutout regions 82 which mate with a complementary portion of attachment tabs 112 on housing 12, and is attached to tabs 112 by welding in the region of cutouts 82. Load diaphragm 76 is shown flat for simplcity, however it actually is preloaded to supply the countering force required to keep slider 52 at the correct separation from the rotating disk. This is explained in more detail hereinbelow, suffice it to say here that the pre-loading is effected by bending outer frame 80 of load diaphragm 76 upwards about the axis connecting cutouts 82, and by bending inner frame 78 downward about the same axis connecting cutouts 82. A tongue 83 located on inner frame 78 is bent to hold transducer wires 53 and provides strain relief to prevent wires 53 from loading slider 52.

A load transfer plate 86 forms a spanning member on the inner frame 78 of load diaphragm 76. It is welded, or otherwise attached, in two places on frame 78. Load transfer plate 86 has a hollow central region into which a horizontally offset transfer plate tab 88 projects from one side of the spanning member. When fully assembled, transfer plate tab 88 is inserted within the region enclosed by suspension pick-up 72. The translation of forces from the load transfer plate 86 to slider 52 occurs at the interface of transfer plate tab 88 and suspension diaphragm dimple 61. A U-shaped load transfer plate pick-up 90, having a dimple 92 on its horizontal span, is welded, or otherwise attached, to the central portion of load transfer plate 86 on the side opposite from the transfer plate tab 88. Load transfer plate pickup 90 is used to unload the head, as explained in more detail hereinabove.

An unload diaphragm 94 has an outer frame 95 and an inner frame formed by legs 96. The outer frame 95 is welded, or otherwise attached to corresponding attachment tabs 106 on housing 12. Tongues 97 are used to further anchor transducer wires 53.

The inner frame legs 96 are used to secure an unload beam 98 to the outer frame 95. This is effected by sliding unload beam 98 between legs 96 and outer frame 95 and welding beam 98 to legs 96. Unload beam 98 also has a hollow central region into which an unload beam tab 99 projects horizontally offset from the plane of beam 98. The unload beam tab 99 is inserted into the region enclosed by transfer plate pick-up 90. The two ends of unload beam 98 have two offset lips 14 which pass through slots 16 in housing 12.

Suspension diaphragm attachment tabs 100 are formed at two diametrically opposed spots on housing wall 108. The cutouts 68 of suspension diaphragm 60 accommodate the vertical portions of the tabs 100, while the horizontal portion of tabs 100 mate with corresponding regions of outer frame 66 of suspension diaphragm 60. The unload diaphragm attachment tabs 106 are formed by punching in diametrically opposed portions of housing walls 108 and rim 102 to form member 110 aligned with tabs 100. A first horizontal surface of member 110 serves as tab 106 for attachment to unload diaphragm 94. The load diaphragm attachment tabs 112 are each formed by punching in a portion of member 110 to form a second horizontal surface which mates with a portion of the load diaphragm outer frame 80, while the cutouts 82 of load diaphragm 76 accommodate the vertical surface portion of tab 112. The tabs are not drawn to scale so that they may be seen more easily. The configuration of attachment tabs 100, 112, and 106 restrains the suspension (60), load (76) and unload (94) diaphragms from lateral motion, but allows unrestricted motion of the members attached to their inner frames. In other words, the slider 52, suspension pick-up 72, load transfer plate 86 and unload beam 98 are free to extend and retract along a common axis which is perpendicular to the rotating disk surface.

The load diaphragm 76 forms a linear spring throughout the operational movement range. Referring now to FIGS. 3A-D, there is shown how load diaphragm 76, as well as for the other diaphragms, is preformed to produce a linear spring. The material used for load diaphragm 76, as well as for the other diaphragms, is cold rolled steel, but other suitable materials may be used. Referring now to FIGS. 3A-C, there is shown the first step in the forming of load diaphragm 76. The outer frame 80 is formed in four separate areas, 140, 141, 142, and 143 respectively, shown shaded for easier identification. The four areas are along two axes, each axis being approximately at 30° from the axis connecting the two cutouts 82. The inner frame 78 is formed in the two shaded areas, 144 and 145, also along the axis connecting the two cutouts 82. Each of the forms for the inner and outer frame are cylindrical in profile, with the outer frame being bent generally upwardly around the axis connecting cutouts 82 and the inner frame being bent generally downwardly around this axis. Preferably, the forming of the two frames is performed simultaneously between rollers which pass along corresponding areas of each frame in a direction transverse to the axis along which the frame is formed.

Next the load transfer plate 86 and pick-up 90 are attached to the load diaphragm 76 (FIG. 3D). The resulting load diaphragms transfer plate assembly is assembled to housing 12 by laterally collapsing outer frame 80 sufficiently to allow its cutouts 82 to slip under the corresponding attachment tabs 112 for attachment thereto. As the second step of the forming operation, the diaphragm 76 is extended by pulling the transfer plate 86 along its transverse axis until the regions of bridges 79, that is, the junctions of the inner and outer frame, yield and those regions and upward, as shown by the dotted lines of FIG. 3D. The solid lines of FIG. 3D show the diaphragm after its release from its stretched position. This two step forming creates an essentially cylindrical profile to each frame when the load diaphragm 76 is in equilibrium, as indicated by the solid lines of FIG. 3D. When the diaphragm 76 is compressed, the narrow portions of the outer frame remain curved upward, due to the angle created when each of the bridges 79 yielded during forming. This allows some lateral flexibility to the outer frame, thus preventing stresses that would cause non-linearities in the deflection-load relationship of the diaphragm 76 when operating through its nominal plane.

Figure 4:
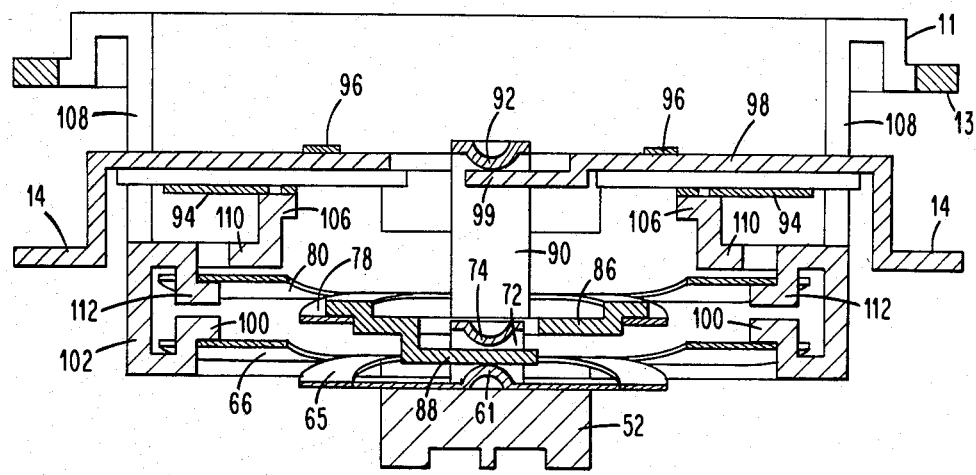
FIGS. 4, 5 and 6 are cross-sectional views of the transducer module showing the range of motion of the various parts from the fully loaded to the fully unloaded transducer positions.
Figure 6:
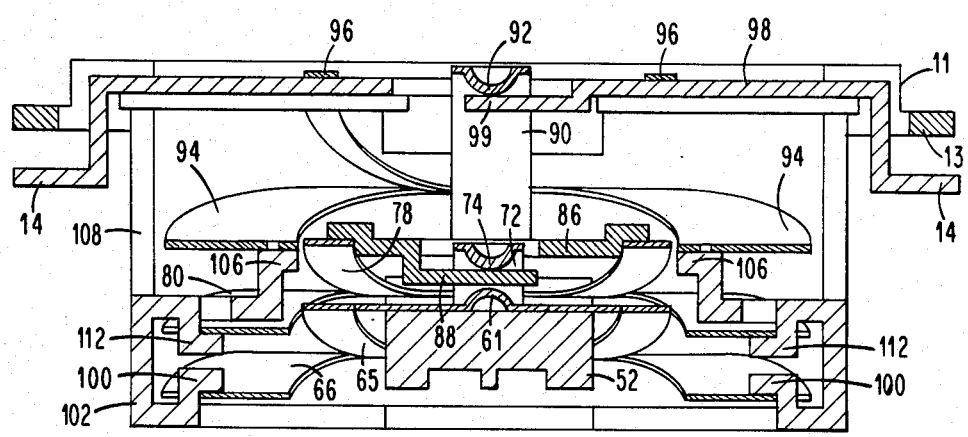

Referring now to FIGS. 4 through 6, there is shown a cross-section of housing 12 illustrating the limits to which the slider 52 can extend and retract. The various parts are not drawn to scale for easier identification. FIG. 4 illustrates the position of the various elements when the slider 52 is allowed to extend fully under the influence of the load diaphragm 76. In this case load diaphragm 76 bows outwardly and the loading force is transmitted via transfer plate tab 88 to pivot dimple 61 on suspension diaphragm 60, which then bows out and pushes slider 52 into an extended position. The outward motion is stopped when the dimple 92 on the spanning member of transfer plate pick-up 90 is intercepted by the unload beam tab 99. FIG. 5 illustrates the effect of the air bearing produced by the rotating disk. In this case the force produced by the air pressure pushes in slider 52 and in turn, via load transfer plate tab 88, load diaphragm 76. In this case, the pre-loaded load diaphragm 76 and suspension diaphragm 60 are each pushed approximately flat and the dimple 92 on the transfer plate pick-up 90 rides up away from the unload beam tab 99. The transfer plate pick-up 90 passes through the unload beam central window with sufficient clearance to allow free and independent vertical motion induced by its coupling to the slider bearing 52, via the load transfer plate 86 and tab 88, during dynamic operation of the head.

Referring now back to FIG. 1, it can be seen that housing 12, and the various elements contained therein, is mounted to the rotary actuator arm 20 by positioning the housing locating surface 11 (see FIG. 5) within a recess 23 in arm 20 and seating the housing reference lip 13 on its corresponding surface of end porion 22 of arm 20, where it is attached using an adhesive, or any other suitable means. The base of load/unload leaf spring 32 is attached on one side of arm 20 and the cantilevered end of load/unload leaf spring 32 is attached to the offset lips 14 on the unload beam 98. Positioned strategically along the leaf spring 32 is a ramp 35 which intercepts a cam 40 positioned accordingly. During the unload operation, the actuator arm 20 rotates until cam 40 contacts ramp 35. Continued rotation of arm 20 causes the leaf spring 32 to be pushed toward arm 20 pivoting at its base and so pushing the unload beam lips 14 toward arm 20. Referring now to FIG. 6 it can be seen that this has the effect of moving the unload beam 98 toward housing lip 13. The unload beam tab 99 interfaces with the transfer plate pick-up dimple 92, which in turn lifts the transfer plate 86, removing the force induced by load diaphragm 76 from slider 52. The slider 52 is lifted from the disk by transfer plate tab 88 interfacing with suspension pick-up dimple 74, centrally located in the U-shaped suspension pick-up 72.

This concludes the description of the preferred embodiment. The head module described provides a low spring rate to the head slider in roll and pitch and in the yaw axis perpendicular to the disk surface. This allows the head slider to maintain the correct attitude throughout its flight, not only during normal operation, but also while loading and unloading onto the disk surface. The particular arrangement of parts also provides to the head slider a high lateral stiffness which prevents low frequency resonance problems. The head module has a relatively low mass, approximately 0.5 gram in the embodiment described, and the particular arrangement provides for an even lower suspended mass.

Modifications to the preferred embodiment will also be apparent to those skilled in the art without departing from the spirit and scope of the present invention. Accordingly, it is intended that this invention be not limited to the embodiments disclosed herein except as defined by the appended claims.

What is claimed is:

1. A transducer module comprising:
a housing having a tubular wall terminating at one end with an opening, said housing having two slots positioned longitudinally on said wall at diametrically opposed locations;
a transducer slider;
a suspension diaphragm having inner and outer frames coupled to form a flexible gimbal, said inner frame having a bridge spanning a central inner frame opening and having a dimple in its center, said suspension diaphragm being positioned across said housing opening and being attached to said housing at two diametrically opposed places in proximity of said housing opening,
said slider being connected to said bridge on the surface facing said housing opening;
a suspension pickup member connected to said bridge on the surface opposite said slider;
a load diaphragm having inner and outer frames coupled to form a flexible gimbal having a central window, said load diaphragm being attached, at a predetermined distance from said suspension diaphragm, to said housing at two diametrically opposed places on said housing;
a load transfer plate disposed across said load diaphragm window and attached to said load diaphragm inner frame, said transfer plate having on one surface a tab adapted to be inserted in said suspension pickup member and on an opposite surface a load pickup member;
an unload diaphragm having an outer frame and a pair of inner legs, said unload diaphragm being attached at a predetermined distance from said load diaphragm to two diametrically opposed places on said housing; and
an unload beam disposed on said unload diaphragm outer frame and secured to said inner legs, said unload beam having a central tab adapted to be inerted in said load pickup member, said unload beam having its two opposite ends protruding from said housing wall through said two slots.

2. The transducer module of claim 1 futher comprising:
means coupled to said protruding ends of said unload beam for selectively pulling said unload beam within said housing to retract said slider toward said housing along the longitudinal axis of said housing.

3. The head module of claim 2 wherein said unload beam pulling means comprise a leaf spring cantilevered from a region of an actuator arm and a cam located at a fixed location.

4. A actuator arm assembly comprising:
an actuator arm adapted to move across a storage disk;
a slider, having pitch, roll and yaw axes, carrying an electromagnetic transducer and having an air bearing surface in the plane of said pitch and roll axes;
a housing adapted to be fixed to and carried by said actuator arm and having at least one major opening in a first plane allowing passage of said slider therethrough;
a suspension diaphragm attached to said housing in proximity of and in a plane parallel to said opening and having a central portion adapted to carry said slider, said slider being attached to said central portion;
a load diaphragm attached to said housing at a predetermined distance from said suspension diaphragm, said load diaphragm being preloaded to exert a predetermined force toward said opening and adapted for urging said slider to a predetermined position relative to said disk; and
means for coupling said load diaphragm to said suspension diaphragm, said diaphragms having relative geometries sufficient to allow each diaphragm to pass through the plane of the other without interference, in response to opposing forces exerted on said slider.

5. The assembly of claim 4 wherein:
said suspension diaphragm comprises a gimbal having lateral stiffness sufficient to prevent oscillations of said slider in a plane parallel to said pitch and roll axes and having sufficient flexibility to permit free movement in the pitch and roll axes of said slider.

6. The assembly of claim 4 wherein:
said load diaphram comprises a gimbal having inner and outer frames, said inner and outer frames having opposing bends to provide said predetermined force.

7. The assembly of claim 4 wherein:
said housing has an end opposite said opening adapted to mate a complementary portion on said actuator arm and to provide easy rotation of said housing on said actuator arm for selecting a predetermined yaw angle.

8. A transducer module for a magnetic recording system, said module having a transducer therein and being adapted to be attached to an actuator arm for use in positioning a transducer at a selected location on a recording surface, comprising:
(a) a housing adapted to be carried by said arm;
(b) a transducer slider on which said transducer is mounted, and said slider having an air bearing surface;
(c) means for suspending said slider from said housing;
(d) means for preloading said slider to extend said slider from said housing toward said recording surface;
(e) means adapted to cooperate with said housing for selectively unloading said slider to retract said slider from said recording surface; and
(f) means connecting said means for unloading with said arm to selectively retract said slider, wherein a portion of said means for suspending passes through a portion of said means for preloading upon the retraction of said slider from said recording surface.

9. A module according to claim 8 further comprising an unload beam fixed to said means for unloading and having a portion extending through an elongated slot in said housing to contact spring means coupled to said arm, whereby said spring means and said unload beam cooperate to actuate said means for unloading to retract said glider.

10. A module according to claim 8 wherein said transducer extends beyond said housing when in its extended position and is retained within said housing when in its retracted position.

11. A module according to claim 10 wherein said means for preloading, said means for unloading, and said means for suspending are all positioned substantially within said housing when said slider is in its retracted position.

12. A module according to claim 8 wherein said means for suspending is a diaphragm having a central portion adapted to carry said slider, and said means for preloading is a diapragm.

13. A module according to claim 12 further comprising means for coupling said preloading diaphragm and said suspending diaphragm and wherein said preloading diaphragm and said suspending diaphragm have geometries sufficient to permit each of said diaphragms to pass through said plane of the other without interference, in response to opposing forces exerted on the slider.

14. A module according to claim 8 wherein said housing is of a shape having an aperture through which said transducer extends toward said recording surface and retracts into said housing and said suspending means and said preloading means are flexible gimbals.

15. A module according to claim 14 further comprising means for coupling said preloading and suspending gimbals wherein said suspension gimbal has lateral stiffness sufficient to prevent oscillations of said slider in a plane parallel to said slider's pitch and roll axes and having sufficient flexibility to permit free movement in the pitch and roll axes of said slider mounted thereon, and said preloading gimbal has inner and outer frames adapted to provide the preloading force to said slider.

16. A transducer module for a disk drive having a magnetic read/write head comprising:
 a slider which supports the head at a predetermined distance from a rotating disk on an air bearing;
 a flexible gimbal on which said slider is mounted;
 a protective housing in which said flexible gimbal is secured;
 a second flexible gimbal secured within said housing, said second flexible gimbal being preloaded to bias said head to a first position toward said disk through a pivot enabling said slider to properly position itself and said head thereon in response to the air flow at the surface of said disk; and
 unloading means for selectively retracting said head to a second position within the boundaries of said housing through a second pivot, whereby said housing protects said head when in the second position and such that a portion of said first gimbal passes through a portion of said second gimbal when the head is moved from said first position to said second position.

* * * * *